UNITED STATES PATENT OFFICE.

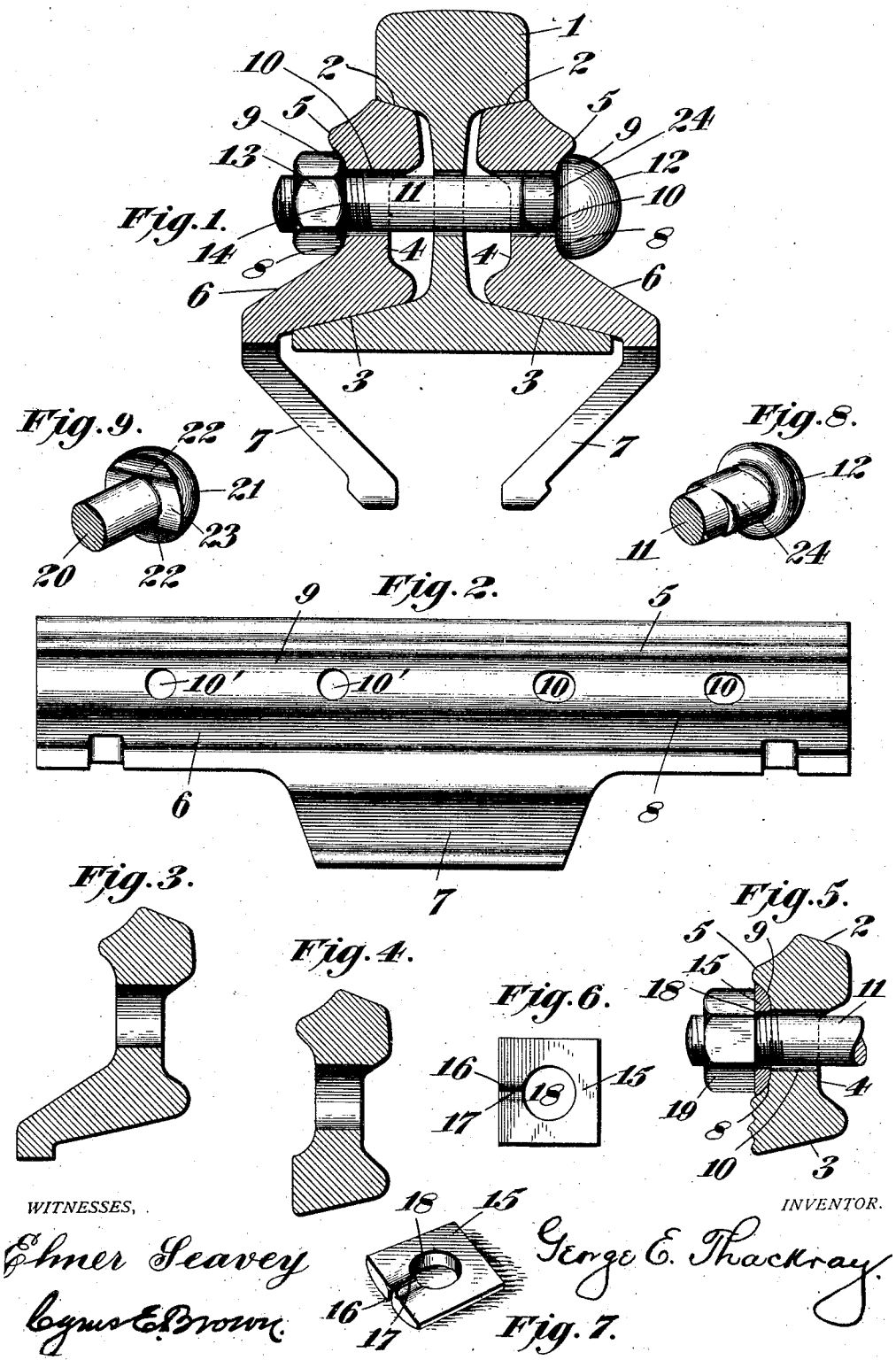

GEORGE E. THACKRAY, OF WESTMONT BOROUGH, PENNSYLVANIA.

RAIL-SPLICE.

1,006,604.

Specification of Letters Patent. Patented Oct. 24, 1911.

Application filed August 15, 1907. Serial No. 388,575.

*To all whom it may concern:*

Be it known that I, GEORGE E. THACK-RAY, a citizen of the United States, residing in the borough of Westmont, in the county of Cambria and State of Pennsylvania, have invented certain new and useful Improvements in Rail-Splices; and I do hereby declare the following to be a full, clear, and exact description of the invention, such as will enable others skilled in the art to which it appertains to make and use the same.

My invention relates to improvements in rail-splices such as are used for connecting the abutting ends of railway track-rails and more particularly to the fastening means for securing various kinds of splice-bars of certain exterior conformation, in position.

In designing and using splice-bars of various kinds, including those having central downwardly projecting flanges, it has sometimes been found desirable to strengthen the upper part of the splice-bar, that is, the member which fits between the lower surface of the rail-head and the surface of the rail-flange, by an external integral thickening or addition of metal, without however, interfering with the flanges of the wheels which run on the track; and similarly, it has been considered advisable under certain conditions, to add to the metal on the exterior surface of an angle splice-bar at the junction of the splice-bar portion and the inclined angle-portion, this latter portion being that which rests upon and bears against the upper surface of the rail-flange. In this strengthening the splice, the added metal at the points previously indicated, has been put in a form, such, that when viewed in vertical cross section, the central part of the exterior of the splice-bar portion is approximately vertical, to which are joined curves of long radii. This part of the exterior surface of the splice-bar portion thus approximates a vertical plane in its intermediate part with portions of cylindrical surfaces tangent to each edge of said plane. On account of the small limits within which this construction has to be designed and the comparatively large size of track bolts or fastenings required to give sufficient strength to the joint, an ordinary nut with a flat bearing surface will not clamp the splice-bars together, as it would not fit properly on their exterior surfaces, but the corners of the nut would only rub against the curved surfaces of the bar in an unmechanical manner. With a knowledge of these difficulties, I have invented the improvements herein described, one of which consists in the use of a track-bolt having a chamfered nut, the chamfer being so made with approximately spheroidal corners that it will turn readily within the curved surfaces of the splice-bar and at the same time maintain a bearing thereon.

In some cases, in order to make a bolt of simple design, the head of which is symmetrical with the axis, I may make the entire bearing surface of the head of a similar spheroidal curvature, so that it will rest in any position against the exterior concavity of the splice-bar, in which case, however, the bolt should have a thickened portion of oval or other form just below the head to fit into a hole of corresponding shape in the splice-bar, to prevent turning the bolt when screwing on the nut.

In the other case as herein referred to, I may make two opposite interior bearing surfaces of the bolt head curved to approximately cylindrical surfaces to fit within the curved portions of the exterior concavity of the splice-bar, the other two portions of the interior bearing surface of the bolt-head being approximately flat to bear against the intermediate portion of the splice-bar, thereby holding the bolt in position without the need of an enlarged or special form of bolt body, which latter may be cylindrical throughout, and the hole in the splice-bar may also be substantially cylindrical.

In order to provide proper bearing for a flat nut and at the same time a nut lock of the spring gripping pattern, I use in this case an approximately square washer, preferably made of hard spring steel, the interior surface of which is shaped and curved to conform to the outline of the intermediate exterior portion of the splice-bar, said washer also being provided with a slot extending from its exterior edge to the bolt opening therein, the edge of the said slot on the exterior surface being provided with a sharp lip to engage with the bearing surface of the nut and hold the same in its screwedup position.

Having thus given a general description of my invention, I will now, in order to make the matter more clear, refer to the accompanying drawings which form part of this specification and in which like characters refer to like parts.

Figure 1 is a vertical cross sectional elevation illustrating an angular splice-bar with inwardly depending flanges, the splice-bar portions of which are curved on their exterior surfaces, showing my improved manner of securing the same in position with a bolt and chamfered nut of special construction. Fig. 2 is a side elevation of one of the splice-bars shown in Fig. 1 but with all other portions removed for the sake of clearness of illustration. As viewed in the drawing, the left hand side of the splice-bar shown in Fig. 2 is provided with cylindrical holes in which to use one form of track bolt, having a cylindrical body throughout, whereas the righthand side of Fig. 2 shows oval holes to be used with another form, having a corresponding enlargement under the head, these two styles of holes being shown on the drawing of one bar for convenience of illustration only. Fig. 3 is a vertical cross section of an angle splice-bar having curved surfaces on the exterior of the splice-bar portion of shape to correspond with the chamfered nut and Fig. 4 is a similar cross section of an ordinary plain splice-bar without the angle-member. Fig. 5 is a vertical cross sectional elevation of a splice-bar provided with my improved washer having a curved surface to fit the curvature of the splice-bar and a bolt having a flat nut bearing upon said washer. Fig. 6 is a side elevation of my improved washer with a lipped slot in one side of the same which serves as a nut-lock, and Fig. 7 is a perspective view of the same. Fig. 8 is a perspective view of the bolt head shown in Fig. 1 which may be used with splice-bars having oval bolt-holes, and Fig. 9 shows a form which may be used when the holes are circular, all as hereinbefore described.

Referring now to the various characters of reference on the drawings:—1 represents a railway-rail of T-section, 2 represents the lower surface of the head of said rail and the upper surface of the splice-bar portion resting against the same, 3 represents the upper surface of the rail-flange and the lower surface of the angle-portion of the splice-bar resting against the same; and 4 represents the splice-bar generally.

5 represents a portion of metal added to the exterior of the head of the splice-bar as heretofore referred to, said added portion being so located and arranged that it serves to strengthen the upper part of the splice-bar, but without interfering with the wheel-flanges.

6 represents the lower portion or angle member of the splice-bar, while 7 represents, in Figs. 1 and 2, the lower depending portion of the splice.

8 represents the curved portion of metal joining the intermediate exterior surface of the main splice-bar section with the angle-portion 6 of the splice-bar, said surface 8 as viewed in section being an easy curve or fillet with a long radius to provide the exterior addition of metal at the angle, or juncture of the two parts.

9 represents a curved surface connecting the thickening 5 with the intermediate exterior portion of the splice-bar, said curve 9 being of the same contour as the lower one 8. Both the curves 8 and 9 are preferably tangent to the intermediate exterior portion of the splice-bar.

As shown in Figs. 1, 2 and 5, 10 represent holes in the splice-bar, which, as shown on the righthand side of Fig. 2, are of oval section, this form being used when the track-bolt is provided with an enlargement of corresponding shape under the head, which fits in said hole to prevent the bolt from turning when the nut is being screwed on or off. As shown on the lefthand side of Fig. 2, the bolt-holes 10′ are cylindrical and only very slightly larger than the body of the bolt. This cylindrical form of hole may be used in connection with my invention, in which case, the shape of the under surface of the head of the bolt, is made to conform throughout as nearly as may be, to the surface of the exterior portions of the splice-bar against which it rests, thus holding the bolt from turning. The cylindrical form of bolt with a head formed to fit within the exterior surface of the splice-bar is simpler in construction and of less weight than a bolt with a thickened body below the head, thus being conducive to economy, besides which, with this style of bolt, the holes in the splice-bar may be much smaller and the splice-bar consequently stronger than one which has larger holes.

Referring to Fig. 1, 11 represents the splice-bolt of the construction as described, having a head 12, and provided with a thread at the other end on which is fitted the nut 13. This nut 13 has a chamfered surface indicated at 14, which is of spheroidal outline adapted to fit the curvature of the exterior portion of the splice-bar against which it abuts, thus allowing the nut to have a proper bearing against the splice-bar and to be screwed or unscrewed as readily as required. This construction of the chamfered nut is valuable in that it provides a simple and efficient means of fastening the concavely curved splice-bars together without requiring them to be cut away or counterbored as would be the case where a nut with a flat bearing is used in direct contact with the splice-bar.

Referring now to Fig. 5, 15 indicates my improved washer which has convex curved surfaces to fit against the corresponding concave curvatures 8 and 9 of the exterior portions of the splice-bar 4 which splice-bar is provided with the upper and lower bearing surface 2 and 3 as heretofore described. For the purpose of convenience of illustration, the lower portion of the splice-bar is omitted in Fig. 5, but, however, the projection 5 is shown and the bolt 11 has on its threaded end, a nut 19 which nut has a flat or plane lower surface resting upon the exterior surface of the washer 15.

Referring now to Figs. 6 and 7, the washer 15 therein illustrated has a central hole 18 and a slot 16 as shown, one edge of which slot is provided with an upwardly projecting lip 17 the sloping side of which is adapted to permit the nut to turn over the same, the other side of said lip being substantially perpendicular to the face of the washer in such a way as to prevent the nut from turning backward or becoming loose, after the fashion of a spring-lock washer. In making this washer, I may bend the portion carrying the lip 17 upward above the surface of the opposite portion, so that it acts like a spring in maintaining the contact of the lip with the nut bearing upon it and thus more efficiently serve the purpose intended.

Referring now to Fig. 8, this shows the form of bolt head as hereinbefore referred to, having a cylindrical body portion 11 and a head 12, all corresponding with the side elevation of the same bolt as shown in Fig. 1. The body portion of the bolt has an enlargement 24 under the head, of oval form to fit in the bolt-hole 10, thus preventing the bolt from turning when the nut is screwed on. The inner surface of the bolt head in this case is approximately spheroidal in form and the cross section of the inner surface taken on a plane through the longitudinal axis of the bolt is substantially the same as the vertical cross section of that portion of the exterior surface of the splice-bar against which it fits, the underside of the bolt head, however, being convex and the surface of the splice-bar being concave.

Referring now to Fig. 9, 20 is the form of bolt in which the head 21 is provided on its under side with two oppositely located surfaces 22 of approximately cylindrical form to fit and bear against the adjoining surfaces 8 and 9 of the splice-bar. The intermediate surface 23 may be either flat or slightly curved, but should conform to the surface of the splice-bar. The inner surfaces of this bolt head fit throughout as closely as practicable to the adjoining surface of the splice-bar, thus providing a substantial bearing, and preventing the bolt from turning when the nut is screwed home.

The nut which forms a part of my invention is chamfered so that all of its inner axial sections conform to the corresponding vertical section of the surface of the splice-bar, and therefore its inner end and corners will contact with the splice-bar simultaneously. Because of this feature the nut acts in an efficient manner and its inner end has no tendency to wedge or bind in the groove of the splice-bar, nor to be compressed radially on the bolt.

I wish it understood that although I have shown and described the shape of the central exterior portion of the splice-bar as approximately plane at its middle, thence joined by curves above and below, this portion may all be curved if desired, or made of a combination of curves and straight surfaces, as may be desired or expedient, as my invention is not limited to connection with one precise or particular form of curve, but it is intended to apply to any form of splice-bar of the kind described, provided with a thickening at its upper edge and a corresponding thickening at the junction of the splice-bar portion and the angle portion.

Of course it will be understood from the foregoing description that in each of the constructions described I provide a clamping member (nut or locking washer) which is beveled to a convex curvature to conform accurately to and fit accurately within the concavity or groove of the splice bar, after tightening.

I do not claim the special form of splice-bar herein illustrated, as part of my invention, but my invention resides in the arrangement and adaptation of the fastening means for the same. It is to be noted, however, that in each of the forms of the invention shown and described the splice bar which forms one element of the combination is made rigid and stiff in a transverse direction, by giving the same a substantially angular shape in cross section, so that thereby the tightening of the bolts does not produce a bending of the bar in a transverse direction. The clamping bolt and the clamping member thereof are so formed with reference to the grooves in the splice bars that said bars do not have to be bent or distorted from their normal shape in order to produce the uniform bearing of the parts as hereinbefore described. Hence the splice bars, in view of the comparatively wide cross sectional area that can be given them, can easily be made of equal or greater strength than the rails themselves, which is manifestly a desideratum.

Although I have shown and described my improvements in considerable detail, I do not wish to be limited to the exact and specific details shown and described, but may use such substitutions, modifications or equivalents thereof, as are embraced within the scope of my invention, as pointed out in the claims.

Having thus described my invention, what I claim and desire to secure by Letters Patent is:

1. In a rail-splice comprising splice bars having concavities with sloping sides extending externally lengthwise thereof and provided with holes therethrough, track bolts inserted within said holes and provided with clamping members having bearing surfaces beveled to conform accurately to and fit accurately within the concavities aforesaid after tightening, whereby the inner faces of such clamping members are then in full and uniform contact with such concavities, the splice bars being stiff and rigid in a transverse direction so as not to bend in that direction when the bolts are tightened.

2. In a rail-splice having splice-bars fitting between the lower surface of the head and the upper surface of the flange of the rails, said splice bars being stiff and rigid in a transverse direction and provided with external longitudinal grooves with sloping sides, splice bolts passing through said splice bars and the rails and each provided with a threaded end, and clamping means on each bolt comprising a member beveled to conform accurately to and bear uniformly against one of the aforesaid grooves, whereby said clamping member, after tightening, has its inner face in full and uniform contact with the corresponding groove.

3. In a rail-splice having splice bars fitting between the lower surface of the head and the upper surface of the flange of the rails, said splice bars being of angular section, to make them stiff and rigid in a transverse direction, and provided with external longitudinal grooves with sloping sides, splice bolts passing through said splice bars and the rails and each provided with a threaded end, and clamping means on each bolt comprising a member beveled to conform accurately to and bear uniformly against one of the aforesaid grooves, whereby said clamping member, after tightening, has its inner face in full and uniform contact with the corresponding groove, each bolt being also provided with a head having bearing surfaces to conform accurately to the cross sectional outline or profile of the groove in which it rests.

4. The combination with a rail-splice-bar of the character described provided with an external integral thickening at the upper part thereof, a corresponding thickening at the junction of the splice member and the angle member thereof, said thickenings being joined to the central part of the body of the bar by sloping surfaces, thereby forming an external longitudinal groove in said bar, of a bolt passing through said bar, and a clamping member on said bolt beveled to conform to and fit accurately within said groove after tightening, whereby the inner surface of said clamping member is then in full uniform contact with the surface of the groove, as described.

5. The combination with a pair of rail-splice-bars of the character described, each having an external integral thickening at the upper part of the splice member thereof and a corresponding thickening at the junction of the splice member and the angle member thereof, said thickenings being joined to the central or intermediate part of the body of the splice-bar member by sloping surfaces, thereby forming an external longitudinal groove or concavity in each of said bars; of bolts passing through said bars, and a clamping member on each bolt beveled to correspond with the contour of the longitudinal groove aforesaid and to fit accurately in said groove after tightening, whereby the inner surface of said clamping member is then in full and uniform contact with the groove, said bolt having a head with its under or bearing side formed to fit the contour of the opposite groove and to rest therein and prevent said bolt from turning.

6. In a rail-splice, a pair of splice-bars each provided with an integral external thickening at the upper part thereof, a corresponding thickening at the junction of the splice-bar portion and the angle portion, said thickenings being joined to the body of the bar by sloping surfaces thereby forming an external longitudinal groove in each of said bars, in combination with splice bolts passing through said bars, said bolts each having a head with its under side shaped to conform to and to lie within the corresponding groove and thereby prevent the bolt from turning, and a clamping member on the opposite end of said bolt chamfered to conform accurately to and fit accurately within the corresponding groove when tightened, whereby said clamping member is then in full and uniform contact with the grooved portion of the splice-bar, as described.

7. In a splice-bar provided with an external longitudinal groove of curved section, a washer having a curved surface to conform to the shape of the said groove and an opposite approximately flat surface, said washer being provided with a slot and an externally projecting up-turned lip on one side of the slot, in combination with a bolt passing through said splice-bar and washer and having a flat-faced nut bearing upon the exterior surface of the said washer.

8. A rail-splice-bar adapted to fit between the head and flange of a rail, and provided with an integral longitudinal thickening above and below the bolt holes therein, washers provided with holes to register with the holes aforesaid, and having a curved surface to fit within said groove between the integral thickenings aforesaid, each of said washers also having a slot extending from one of its edges to the hole therein, a lip struck up from one of the sides of said slot, the portion carrying said lip being formed upward out of line with the general surface of the washer, thereby forming a substantial bearing and a spring-lock for the flat nut of track-bolt inserted through the openings aforesaid.

In testimony whereof I hereto affix my signature in the presence of two witnesses.

GEORGE E. THACKRAY.

Witnesses:
 CYRUS E. BROWN,
 WM. J. FITZMAURICE, Jr.

---

Copies of this patent may be obtained for five cents each, by addressing the "Commissioner of Patents, Washington, D. C."